United States Patent

[11] 3,633,756

| [72] | Inventor | Kenneth Ernest Buckman<br>Southampton, England |
|---|---|---|
| [21] | Appl. No. | 8,999 |
| [22] | Filed | Feb. 5, 1970 |
| [45] | Patented | Jan. 11, 1972 |
| [73] | Assignee | General Motors Corporation<br>Detroit, Mich. |
| [32] | Priority | Feb. 8, 1969 |
| [33] | | Great Britain |
| [31] | | 6,971/69 |

[54] FILTER ELEMENTS FOR LIQUID FILTERS
5 Claims, 9 Drawing Figs.

[52] U.S. Cl. ............................................. 210/443,
210/493, 55/498, 55/521
[51] Int. Cl. ........................................... B01d 27/06
[50] Field of Search ................................ 210/94,
311, 441, 442, 493, 440, 438, 443; 55/498, 521

[56] References Cited
UNITED STATES PATENTS

| 2,731,108 | 1/1956 | Kennedy | 210/493 X |
| 2,968,361 | 1/1961 | Backman | 210/493 X |
| 3,105,042 | 9/1963 | Rossa | 210/94 |
| 3,502,218 | 3/1970 | Taffnell et al. | 210/440 X |

FOREIGN PATENTS

| 1,222,727 | 6/1960 | France | 210/493 |

*Primary Examiner*—Samih H. Zaharna
*Assistant Examiner*—Frederick F. Calvetti
*Attorneys*—P. A. Taucher and S. Carter ABSTRACT: A filter element suitable in particular for a liquid fuel filter is formed by folding a strip of crepe filter paper on itself about a medial longitudinal fold line to bring the two halves of one face of the sheet into apposition and then folding the folded sheet in accordion fashion about a regularly spaced series of transverse fold lines, the opposite face of the sheet having lines of adhesive applied to it adjacent its longitudinal edges so that, on each half of the sheet the free edge of one-half of each pleat is sealed to the free edge of an apposed half of an adjacent pleat, the strip being formed into a zigzag folded pocket, the assembly of pleats thus formed being joined at its opposite ends to form a hollow tubular filter element.

Inventor
Kenneth Ernest Buckman
BY
Peter A. Gaucher
Attorney

FILTER ELEMENTS FOR LIQUID FILTERS

This invention relates to filter elements for liquid filters and in particular to filter elements, and filter units including such filter elements, for use in the filtration of liquid fuels for internal combustion engines.

According to the invention a filter element is formed from a strip of sheet filter material folded on itself about a medial longitudinal fold line to bring the two halves of one face of the sheet into apposition, the folded sheet then being folded about a series of regularly spaced fold lines extending transversely of the strip to form the folded sheet into a series of accordion pleats, the opposite face of said sheet having applied thereto adjacent each longitudinal edge of the sheet a line of adhesive by which, on each half of the sheet, the free edge of one-half of each pleat is sealed to the free edge of an opposed half of an adjacent pleat, one-half of each end portion of the folded strip being sealed to the apposed other half thereof adjacent the end edges of the strip.

The assembly formed from the folded and pleated strip may be joined at its opposite ends and formed into a hollow tubular element the inner periphery of which may be sealed to a tubular spigot and the outer periphery of which may be sealed to the wall of a housing to form a filter unit in which liquid admitted at the end of the element opposite that including the central fold of the strip can pass between the adjacent pairs of sealed ends of the pleats and through the zigzag folded pocket formed by the sheet thus folded and pleated.

The strip may be impressed with spacer dimples or other formations so that there are adequate flow passages between the opposed parts of the pleats.

Preferred embodiments of the invention will now be described with reference to the accompanying drawings in which.

In order to form a filter element according to the invention a strip 1 of filter paper, which may be crepe paper impregnated with synthetic resin, or containing synthetic resin incorporated in the paper during its manufacture, or may be synthetic resin impregnated filter paper, is used. The paper strip 1 may be formed with a central fold line 2 and a plurality of regularly spaced transverse fold lines 3, or, if not suitable for the preforming of fold lines therein, may be folded, as subsequently described at the positions indicated by such lines.

Figure 1:
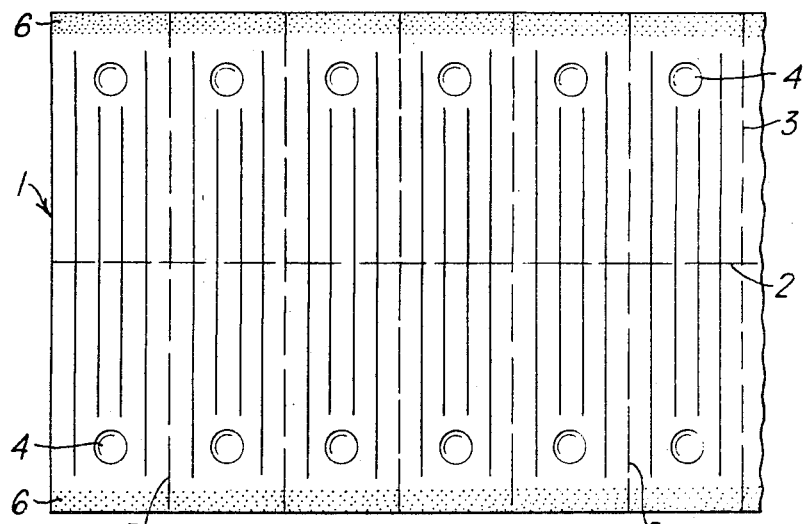
FIG. 1 is a plan of a portion of a strip of sheet filter material prior to its formation into a filter element in accordance with the invention.
Figure 2:
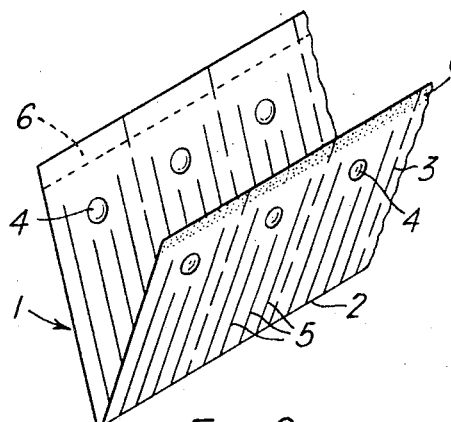
FIGS. 2 and 3 show in perspective two further stages in the formation of the filter element.

Two lines of adhesive 6 are respectively applied to opposite longitudinal edges of the strip on one face thereof and the strip is then folded about the central fold line 2, as shown in FIG. 2 so that one-half of the other face of the sheet is brought into apposition with the other half thereof and the lines of adhesive 6 are on the outside of the folded sheet 1.

Figure 3:
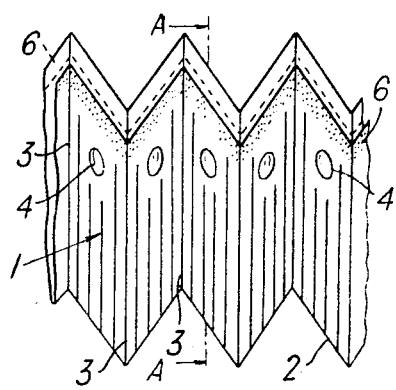
Figure 4:
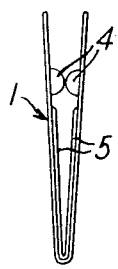
FIG. 4 is a section on the line 4—4 of FIG. 3.
Figure 7:
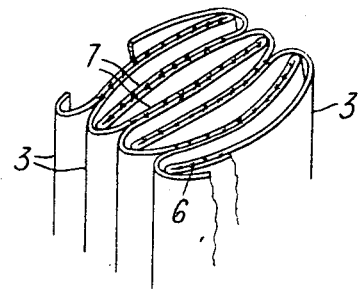
FIG. 7 is an enlarged detail of one end of a portion of the filter element formed as shown in FIGS. 1 to 3.

The doubled sheet 1 is then folded about the transverse fold lines 3 to form the doubled strip into a plurality of according pleats, as shown in FIG. 3, the line of adhesive at the free edge of one-half of a pleat adhering and forming a seal with that on the apposed half of an adjacent pleat when the pleats are pressed together, as shown in FIG. 7.

Thus, as can be seen from FIGS. 3 and 7 each half of the strip is formed into a series of pleats which is integrally joined at its lower end with a similar series of pleats formed in the other half of the folded strip and the apposed faces of the parts of the pleats are sealed together at the outer face of the folded strip adjacent the free upper edges of each series of pleats but the inner face of each series of pleats are not sealed to the inner face of the other series of pleats so that liquid can enter freely between the inner faces of the folded strip, as shown at 7 in FIG. 7, and flow from the inner to the outer face of a zigzag pocket formed by the pleated and folded strip.

Figure 5:
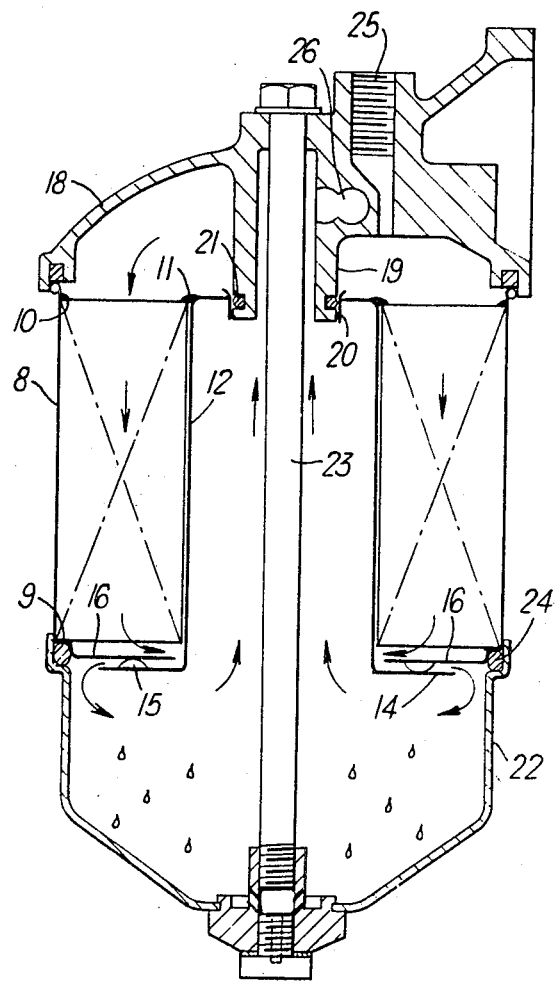
FIG. 5 is a vertical section through a fuel filter assembly incorporating a filter element according to the invention.
Figure 6:
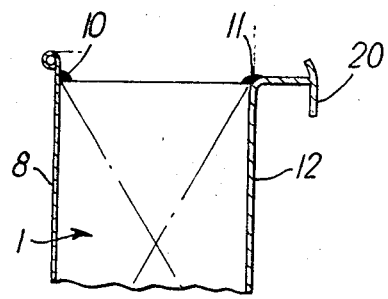
FIG. 6 is an enlarged detail of FIG. 5.

As shown in FIG. 5, a filter element formed as shown in FIGS. 1 to 4 and 7 may have the ends of the folded and pleated strip sealed, as by adhesive or crimping, and then be formed into a hollow tubular element which can be fitted within a metal container or casing 8, the base 16 of which is formed with a central opening and an internal step 9 on which the end of the filter element containing the fold line 2 is seated, the upper end of the element being sealed by adhesive at its outer periphery to the wall of the casing 8 at 10 and at its inner periphery being adhesively sealed at 11 to the upper end of a center tube 12 which is inserted within the element from the lower end thereof and is formed with an outwardly extending flange 14 which has dimples or like formations 15 impressed therein to space the flange from the lower end of the filter casing 8. Alternatively, or additionally, the annular base 16 of the casing 8 may have similar dimples or other formations 17 impressed therein to space the center tube flange 14 and the base 16 of the casing 8 from each other.

The assembly of the element formed from the pleated strip 1 with the center tube 12 and casing 8 forms a filter unit which can be readily used as a replaceable unit in a fuel filter, as shown in FIG. 5. The center tube 12 is adapted to form a seal at its upper end with a spigot 19 of a filter head 18, for example, by means of a neck 20 at the inner periphery of the upper end of the center tube 12 in engagement with a seal ring 21 located in an annular recess on the outer periphery of the spigot 19.

A water container 22 is secured to the lower end of the casing 8 by a center bolt 23, a gasket 24 being interposed between a peripheral flange at the upper end of the water container and a corresponding shoulder at the outer periphery of the base of the casing 8.

In use, liquid, for example, liquid fuel, is delivered to the interior of the head 18 through an inlet passage 25 and passes downwardly through the filter element, flowing from the inside to the outside of the pleated pocket formed by the pleated and folded strip of the filter element.

During its passage through the filter element solid particles are retained by the paper of the filter element and in addition, water which is entrained with the liquid fuel agglomerates into larger particles which separate out from the liquid fuel and, because of their greater density, fall to the bottom of the water container 22, the filtered liquid fuel passing upwardly through the center tube 12 to an outlet passage 26 in the filter head 18.

The construction of the flanged lower end of the center tube 12 and the base of the container 8 which is spaced therefrom ensures that the filtered liquid travels radially outwards from adjacent the inner periphery of the element at the lower end thereof between the flange 14 and the base 16 of the container 8, the velocity of the liquid thereby being reduced and the separated drops of water being directed towards the periphery of the water container where they are less likely to become reentrained in liquid fuel passing upwardly through the center tube 12.

Figure 8:
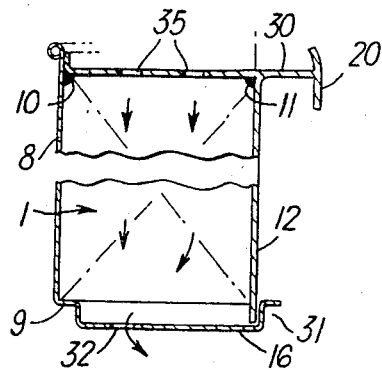
FIGS. 8 and 9 are detail sections respectively of modifications of the filter shown in FIG. 5.

In an alternative form of construction shown in FIG. 8 the center tube is formed at its upper end with an integral annular plate 30 with openings 35 therein, a line of adhesive 10 being applied to the junction between the paper filter element and the casing 8 and also at 11 to the angle between the annular plate 30 and the center tube 12, the latter then being inserted within the filter element until it engages the upper end of the latter, the two lines of adhesive then being forced into any V-shaped pockets at the inner and outer peripheries of the elements so as to seal the element effectively at its inner and outer peripheries.

The lower end of the center tube may fit over a neck 31 formed at the inner periphery of the base 16 of the casing 8, the latter having openings 32 adjacent the outer periphery of the base of the casing so as to ensure the desired direction of flow of the filtered liquid.

Figure 9:
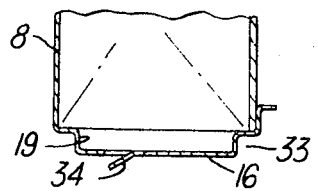

As shown in FIG. 9, the base 16 of the casing 8 may have a step 33 at its inner periphery as well as the step 9 at its outer periphery and may be formed with lanced openings 34 adjacent its outer periphery.

The center tube 12 and neck 20 with the plate 30 or flange 14 may be formed as a plastics moulding.

I claim:

1. A filter element comprising a strip of sheet filter paper material folded on itself about a center longitudinal line to bring the two halves of the inner face of the strip together, the strip further being folded in a series of regularly spaced lines extending transversely of the strip to form the strip into a series of accordion pleats, the outside face of said strip having applied thereto adjacent each longitudinal edge thereof an adhesive by which on each half of the strip, the free edge of one-half of each pleat is sealed to the free edge of an apposed half of an adjacent pleat, one-half of each end portion of the folded strip being sealed to the apposed other half thereof adjacent the end edges of the strip thereby forming a zigzag pocket.

2. A filter unit, comprising a strip of sheet filter paper material folded on itself about a centerline to bring the inner faces of the strip together, the strip also being folded about a series of regularly spaced lines extending transversely of the centerline of the strip to form the strip into a series of accordion pleats, the edges of the outside faces of said strip on opposite sides of the centerline having an adhesive applied thereto, by which the free edge of each accordion pleat is sealed to the free outside edge of an apposed half of an adjacent pleat, with one-half of each end portion of the folded strip being sealed to an apposed other half thereof adjacent the outside end edges of the strip to form a zigzag pocket, said folded strip having its opposite ends sealed to each other to form the assembly into a hollow tubular element, the inner periphery of said tubular element being sealed to a tubular spigot and the outer periphery of said tubular element being sealed to the wall of a casing which surrounds said element, so that a liquid admitted to the element at the end thereof opposite that which includes the central fold of the strip can pass from the inner to the outer sides of the zigzag pocket.

3. A filter unit according to claim 2, in which said casing is a hollow member having an annular base with a double passageway formed therein on which the end of the filter element is seated, said double passageway creating a tortuous path to the filtered liquid to obtain more complete filtration.

4. A filter unit according to claim 3 having a spigot at the end opposite said annular base, said spigot having a radial flange which is spaced inwardly from said annular base in the path of fluid flow so as to form therewith a flow passage by which filtered liquid is directed radially outwardly from the base of said casing toward said spigot.

5. A filter unit according to claim 2, in which said spigot has extending from the end thereof adjacent the sealed ends of the pleats a radial flange which overlies and is sealed to the inner and outer periphery of the element and is sealed at its outer periphery to said casing, said flange having openings intermediate its inner and outer peripheries to allow the entry of liquid to the ends of the pleats.

* * * * *